United States Patent
Ho et al.

(10) Patent No.: US 11,748,965 B2
(45) Date of Patent: Sep. 5, 2023

(54) VIRTUAL IMAGE DISPLAY SYSTEM AND VIRTUAL IMAGE DISPLAY METHOD

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/557,056

(22) Filed: Dec. 21, 2021

(65) Prior Publication Data
US 2023/0100999 A1 Mar. 30, 2023

Related U.S. Application Data

(60) Provisional application No. 63/249,538, filed on Sep. 28, 2021.

(51) Int. Cl.
| | |
|---|---|
| *G06F 3/0346* | (2013.01) |
| *G06F 3/01* | (2006.01) |
| *G06T 19/20* | (2011.01) |
| *G06K 7/14* | (2006.01) |

(52) U.S. Cl.
CPC .............. *G06T 19/20* (2013.01); *G06F 3/011* (2013.01); *G06F 3/012* (2013.01); *G06F 3/013* (2013.01); *G06F 3/0346* (2013.01); *G06K 7/1413* (2013.01); *G06T 2219/2016* (2013.01)

(58) Field of Classification Search
CPC ............. G06T 19/20; G06T 2219/2016; G06F 3/0346; G06F 3/011; G06F 3/012; G06F 3/013; G06F 3/0383; G06F 3/04842; G06K 7/1413
See application file for complete search history.

(56) References Cited

U.S. PATENT DOCUMENTS

| | | | | |
|---|---|---|---|---|
| 9,710,057 | B2* | 7/2017 | Mikhailov | G06T 7/251 |
| 9,936,916 | B2* | 4/2018 | Sahin | A61B 5/486 |
| 10,405,786 | B2* | 9/2019 | Sahin | A61B 7/04 |
| 10,782,531 | B2* | 9/2020 | Tomizawa | G06T 19/006 |
| 11,036,284 | B2* | 6/2021 | Himane | G06T 7/74 |
| 11,181,990 | B2* | 11/2021 | Marks | A63F 13/5258 |
| 11,184,967 | B2* | 11/2021 | Coleman | G01S 7/497 |
| 11,340,460 | B2* | 5/2022 | Muldoon | G06F 3/04842 |
| 2015/0223731 | A1* | 8/2015 | Sahin | A61B 5/16 600/595 |
| 2018/0374269 | A1 | 12/2018 | Smith | |

(Continued)

OTHER PUBLICATIONS

"Office Action of Europe Counterpart Application", dated Jan. 4, 2023, p. 1-p. 8.

*Primary Examiner* — Vijay Shankar
(74) *Attorney, Agent, or Firm* — JCIPRNET

(57) ABSTRACT

A virtual image display system and a virtual image display method are provided. The virtual image display method includes: displaying, by a handheld electronic device, an identification pattern, where the identification pattern corresponds to an object image; photographing, by a virtual image display, the identification pattern and displaying the object image according to the identification pattern; and capturing, by the virtual image display, inertial measurement information of the handheld electronic device when the identification pattern disappears and adjusting at least one of a position and a direction of the object image according to the inertial measurement information.

12 Claims, 6 Drawing Sheets

(56) References Cited

U.S. PATENT DOCUMENTS

| | | | |
|---|---|---|---|
| 2019/0079288 A1* | 3/2019 | Liu | G02B 27/017 |
| 2020/0143600 A1 | 5/2020 | Dai et al. | |
| 2021/0239983 A1 | 8/2021 | Song et al. | |
| 2022/0197480 A1* | 6/2022 | Tokuchi | G02B 27/0172 |
| 2022/0293036 A1* | 9/2022 | Yamasaki | G06F 3/012 |

* cited by examiner

VIRTUAL IMAGE DISPLAY SYSTEM AND VIRTUAL IMAGE DISPLAY METHOD

CROSS-REFERENCE TO RELATED APPLICATION

This application claims the priority benefit of U.S. provisional application Ser. No. 63/249,538 filed on Sep. 28, 2021. The entirety of the above-mentioned patent application is hereby incorporated by reference herein and made a part of this specification.

BACKGROUND

Technical Field

The disclosure relates to a virtual image display system and a display method thereof, and particularly relates to a virtual image display system and a display method thereof capable of improving image display performance.

Description of Related Art

With the evolution of electronic technology, virtual image displays capable of delivering virtual reality and augmented reality have gradually become the mainstream. In today's technology, in order to enhance the user experience in the virtual image world, accessories worn by the user can also be paired up to provide a mechanism for the user to interact with the object image displayed in the virtual world.

SUMMARY

The disclosure provides a virtual image display system and a display method thereof capable of improving a display effect of a virtual object image.

The disclosure provides a virtual image display method, and the method includes the following steps. A handheld electronic device displays an identification pattern, and the identification pattern corresponds to an object image. The identification pattern is photographed by a virtual image display, and the object image is displayed according to the identification pattern. When the identification pattern disappears, inertial measurement information of the handheld electronic device is captured by a virtual image display, and at least one of a position and a direction of the object image is adjusted according to the inertial measurement information.

The disclosure further provides a virtual image display system including a handheld electronic device and a virtual image display. The handheld electronic device is configured to display an identification pattern, and the identification pattern corresponds to an object image. The virtual image display is electrically coupled to the handheld electronic device, and the virtual image display is configured for photographing the identification pattern and displaying the object image according to the identification pattern. When the identification pattern disappears, inertial measurement information of the handheld electronic device is captured by the virtual image display, and at least one of a position and a direction of the object image is adjusted according to the inertial measurement information.

Based on the above, the virtual image display of the disclosure controls the position and/or direction of the displayed object image by photographing the identification pattern on the handheld electronic device and analyzing the position and direction information of the identification pattern. Moreover, when the identification pattern disappears, the virtual image display can control the position and/or direction of the displayed object image according to the inertial measurement information of the handheld electronic device, and the display effect of the virtual object image is thereby improved.

DESCRIPTION OF THE EMBODIMENTS

Figure 1:
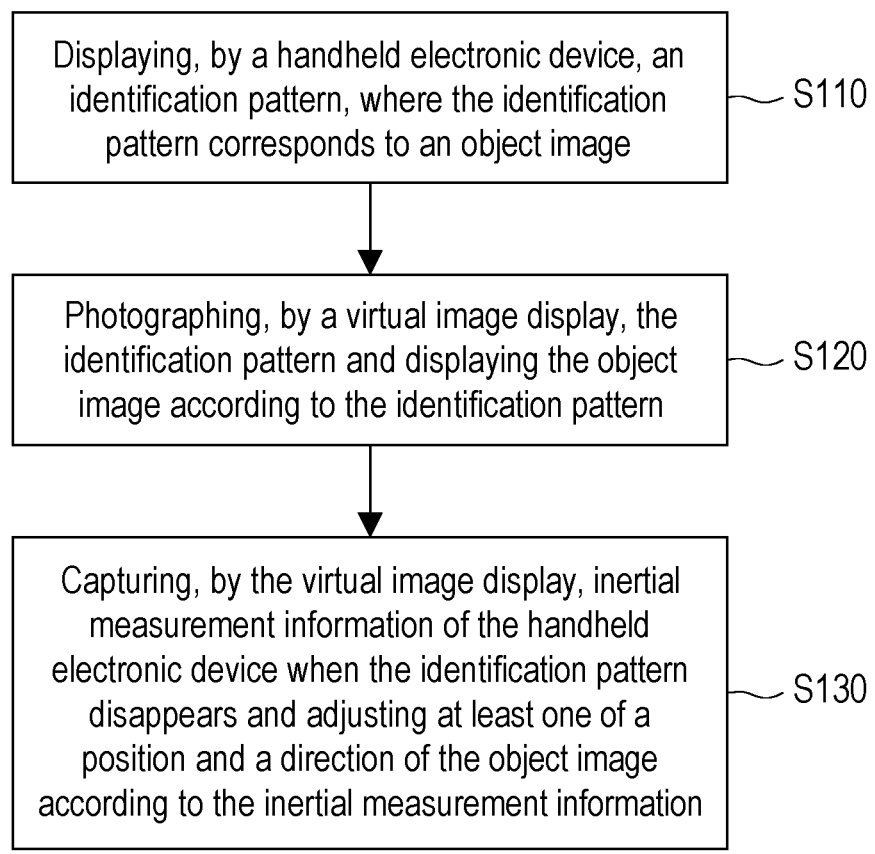
FIG. 1 is a flow chart illustrating a virtual image display method of according to an embodiment of the disclosure.

Referring to FIG. 1, FIG. 1 is a flow chart illustrating a virtual image display method according to an embodiment of the disclosure. In step S110, an identification pattern is displayed by a handheld electronic device, and the identification pattern may correspond to an object image. In step S120, the identification pattern displayed by the handheld electronic device is photographed by the virtual image display, and the virtual image display displays the corresponding object image according to the identification pattern. In this embodiment, the object image may be a three-dimensional object image. The virtual image display may be a head-mounted display and may produce virtual reality or augmented reality display effects. The handheld electronic device may be a user's mobile phone and has a display to display the identification pattern. In this embodiment, the virtual image display has an image capturing device (e.g., a camera) that can be used to capture the identification pattern displayed by the handheld electronic device. By analyzing the obtained identification pattern, the virtual image display may display a three-dimensional virtual object image corresponding to the identification pattern.

Figure 2A:
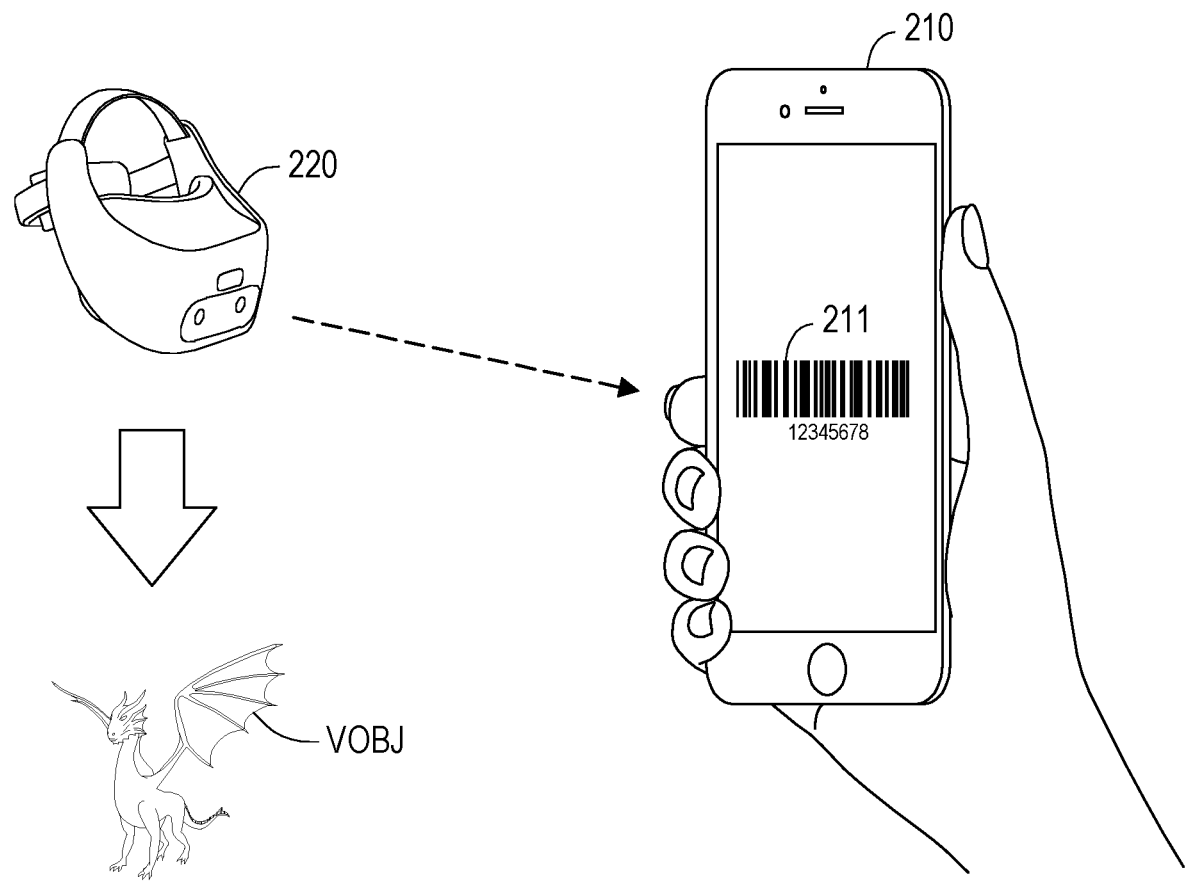
FIG. 2A to FIG. 2C are schematic views illustrating control of an object image according to an embodiment of the disclosure.
Figure 2B:
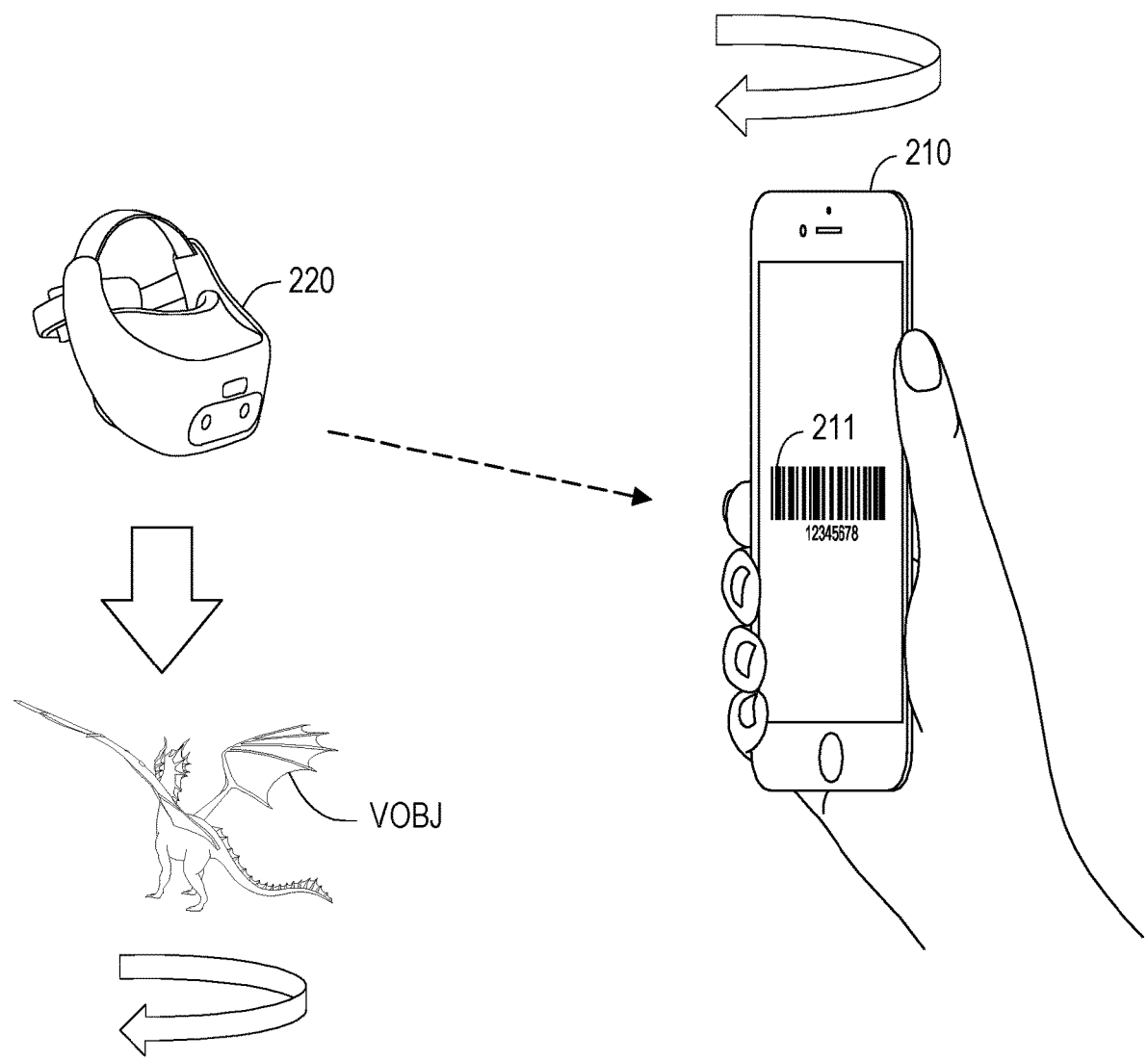

Referring to FIG. 1, FIG. 2A, and FIG. 2B together, FIG. 2A and FIG. 2B are schematic views illustrating control of the object image according to an embodiment of the disclosure. In FIG. 2A, the handheld electronic device 210 may display an identification pattern 211. The identification pattern 211 may be a bar-code or a multi-dimensional bar-code (e.g., a quick response code (QR code)) or an identification pattern designed by the engineering staff, which is not particularly limited. The identification pattern 211 corresponds to a virtual object image VOBJ. The object image VOBJ is a three-dimensional image.

In addition, the virtual image display 220 (e.g., a head-mounted display) may photograph the identification pattern 211 on the handheld electronic device 210 and searches a database to obtain the object image VOBJ corresponding to the identification pattern 211. Furthermore, the virtual image display 220 may display the object image VOBJ. The database in the virtual image display 220 may record a variety of object images and corresponding identification codes thereof, and the identification codes may be presented by using different identification patterns.

In this embodiment, the user may control the object image displayed by the virtual image display by changing position and direction information of the handheld electronic device. For example, in FIG. 2B, when the user rotates the handheld electronic device 210, the identification pattern 211 on the handheld electronic device 210 photographed by the virtual image display 220 may change in size due to the rotation of the handheld electronic device 210. In this way, the virtual image display 220 may analyze the position and direction information of the identification pattern 211 and adjust at least one of a position and a direction of the object image VOBJ through the change of the position and direction information of the identification pattern 211.

In this embodiment, the user may rotate the handheld electronic device 210 to synchronize the rotation of the object image VOBJ. In other embodiments of the disclosure, the user may also adjust the display position and/or direction of the object image VOBJ by moving the handheld electronic device 210.

In step S130, when the identification pattern 211 disappears and cannot be photographed by the virtual image display 220, the virtual image display 220 captures inertial measurement information (IMF) of the handheld electronic device 210, and the virtual image display 220 adjusts at least one of a display position and a direction of the object image VOBJ according to the inertial measurement information of the handheld electronic device 210.

Figure 2C:
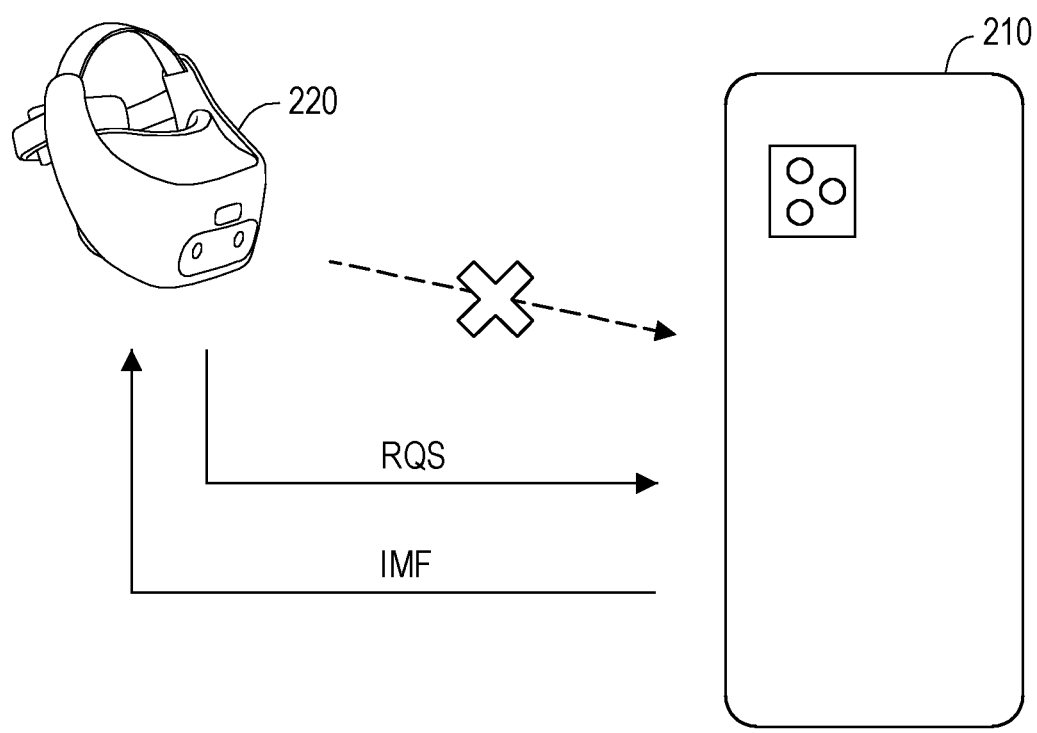

Referring to FIG. 2C, FIG. 2C is a schematic view illustrating control of the object image according to an embodiment of the disclosure. When the identification pattern 211 disappears and cannot be photographed by the virtual image display 220, for example, when the handheld electronic device 210 is rotated to the back so that the virtual image display 220 cannot successfully photograph the identification pattern 211, the virtual image display 220 may receive the inertial measurement information IMF sent by the handheld electronic device 210. The virtual image display 220 may obtain the position and direction information of the handheld electronic device 210 according to the inertial measurement information IMF and may continue to adjust at least one of the display position and the direction of the object image VOBJ according to the position and direction information of the handheld electronic device 210.

In detail, when the identification pattern 211 disappears and cannot be photographed by the virtual image display 220, the virtual image display 220 may transmit a request signal RQS to the handheld electronic device 210. Detection of the inertial measurement information IMF may then be activated by the handheld electronic device 210 according to the request signal RQS. The handheld electronic device 210 transmits the detected inertial measurement information IMF to the virtual image display 220. Note here that the handheld electronic device 210 does not continuously transmit the inertial measurement information IMF, but only detects and transmits the inertial measurement information IMF after receiving the request signal RQS sent by the virtual image display 220 to reduce power consumption. In this embodiment, when the virtual image display 220 recognizes that a back surface of the handheld electronic device 210 faces the virtual image display 220 according to the inertial measurement information IMF of the handheld electronic device 210, the virtual image display 220 may correspondingly display a back surface of the object image of VOBJ.

It is worth mentioning that, when the virtual image display 220 transmits the request signal RQS (when the identification pattern 211 disappears), the virtual image display 220 may synchronously activate a timer and calculate duration of disappearance of the identification pattern 211. When the duration of disappearance of the identification pattern is greater than a predetermined length of time and when the virtual image display 220 cannot re-photograph the identification pattern 211, this means that the user may no longer need to display the object image VOBJ. Therefore, the virtual image display 220 may stop displaying the object image VOBJ and stop transmitting the request signal RQS.

Correspondingly, when the request signal RQS disappears, the handheld electronic device 210 may synchronously stop the inertial measurement and stop transmitting the inertial measurement information IMF.

The aforementioned predetermined length of time may be set by a designer and may also be set by the user through a user interface provided by the handheld electronic device 210 and/or the virtual image display 220, which is not particularly limited.

From the descriptions above, it is known that in the virtual image display method provided by the embodiments of the disclosure, when the virtual image display 220 cannot photograph the identification pattern 211, the virtual image display 220 may still continue to display the object image VOBJ and adjust the display position and direction of the object image VOBJ, and the display performance of a virtual image is thereby enhanced.

Figure 3:
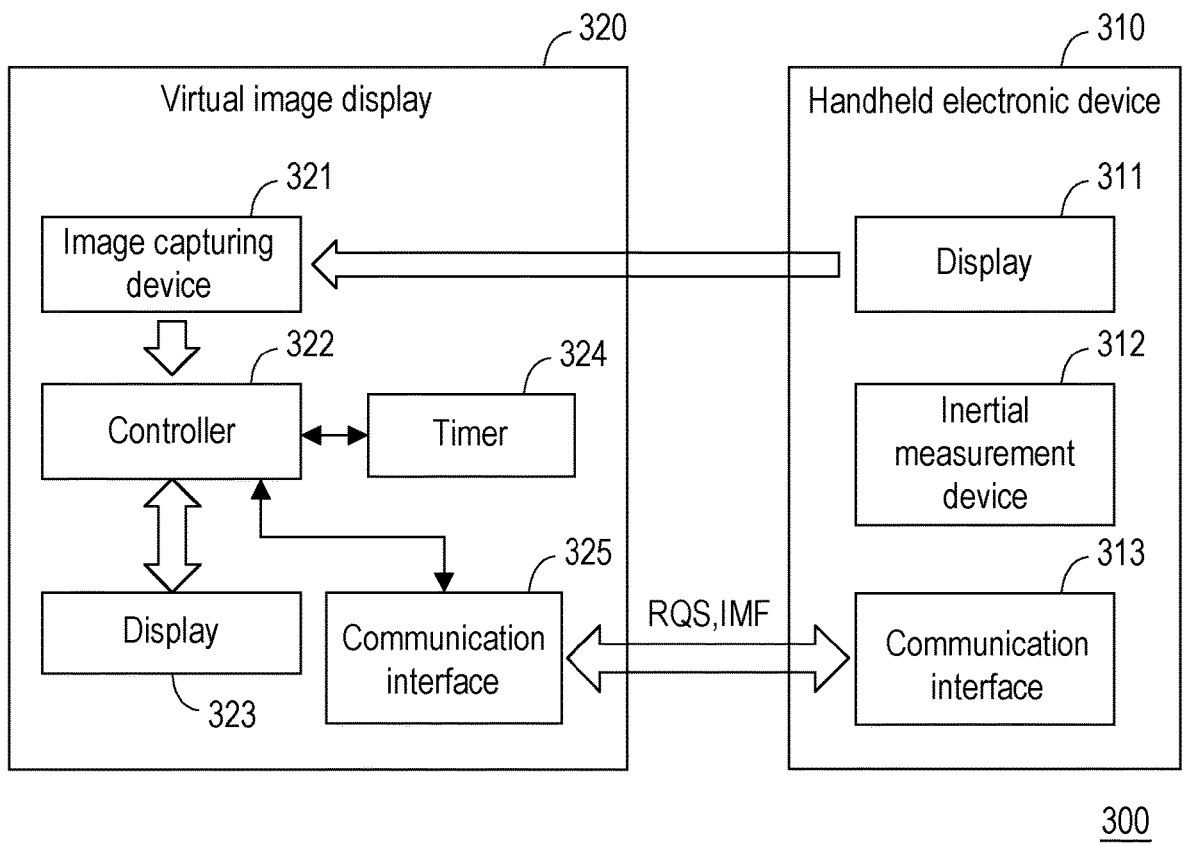
FIG. 3 is a schematic diagram illustrating a virtual image display system according to an embodiment of the disclosure.

Referring to FIG. 3, FIG. 3 is a schematic diagram of a virtual image display system according to an embodiment of the disclosure. A virtual image display system 300 includes a handheld electronic device 310 and a virtual image display 320. The handheld electronic device 310 includes a display 311, an inertial measurement device 312, and a communication interface 313. The virtual image display 320 includes an image capturing device 321, a controller 322, a display 323, a timer 324, and a communication interface 325. The handheld electronic device 310 and the virtual image display 320 are electrically coupled to each other. The display 311 of the handheld electronic device 310 is configured to display the identification pattern. The image capturing device 321 of the virtual image display 320 captures the identification pattern, and the controller 322 obtains the object image corresponding to the identification pattern according to the identification pattern. The controller 322 may also enable the display 323 to display the object image.

When the identification pattern does not disappear and the position and direction information is changed, the controller 322 may adjusts at least one of the position and the direction of the object image according to the change of the position and direction information of the identification pattern.

In contrast, when the identification pattern disappears, the controller 322 may transmit the request signal RQS to the communication interface 313 of the handheld electronic device 310 through the communication interface 325. The handheld electronic device 310 activates the inertial measurement device 312 according to the received request signal RQS and accordingly obtains the inertial measurement information IMF of the handheld electronic device 310. The handheld electronic device 310 returns the inertial measurement information IMF to the virtual image display 320 through the communication interface 313. The controller 322 of the virtual image display 320 continuously adjust at least one of the position and the direction of the object image according to the inertial measurement information IMF.

On the other hand, when the identification pattern disappears, the controller 322 may synchronously activate the timer 324 for timing and calculate the duration of disappearance of the identification pattern. When a timing result of the timer 324 shows that the duration of disappearance of the identification pattern is greater than the predetermined length of time, the controller 322 drives the display 323 to step displaying the object image and stops transmitting the request signal RQS. The handheld electronic device 310 correspondingly stops the inertial measurement device 312 and stops returning the inertial measurement information IMF to the virtual image display 320.

In this embodiment, the timer 324 may be implemented by using a counting circuit well known to those skilled in the art and may be set outside the controller 322. In other embodiments of the disclosure, the timer 324 may also be built in the controller 322, which is not particularly limited. In addition, the communication interfaces 325 and 313 of this embodiment may be in any form and are wireless or wired communication interfaces known to those with ordinary knowledge in the art, which are not particularly limited in the disclosure. In addition, the controller 322 may be a processor with computing capability. Alternatively, the controller 322 may be a hardware circuit designed through a hardware description language (HDL) or any other digital circuit design method known to those with ordinary knowledge in the art and may be implemented through a field programmable logic gate array (FPGA), a complex programmable logic device (CPLD), or an application-specific integrated circuit (ASIC).

Figure 4:
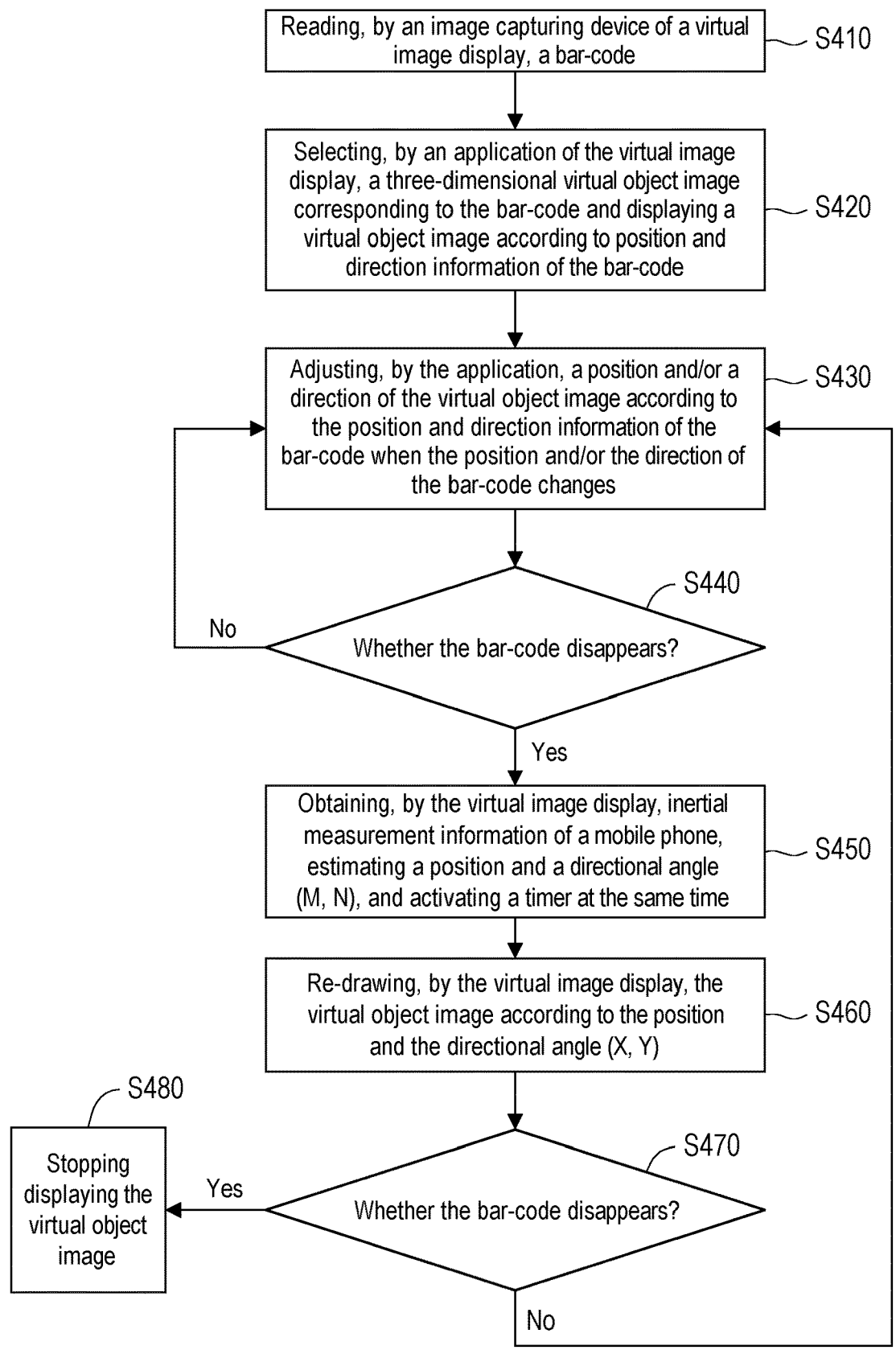
FIG. 4 is a flow chart illustrating operations of the virtual image display system according to an embodiment of the disclosure.

Referring to FIG. 4, FIG. 4 is a flow chart illustrating the virtual image display system according to an embodiment of the disclosure. In step S410, the virtual image display executes an application to enable the image capturing device to read the bar-code (identification pattern) displayed on the handheld electronic device (mobile phone). In step S420, the application of the virtual image display selects a three-dimensional virtual object image corresponding to the bar-code and displays the virtual object image according to the position and direction information of the bar-code. In step S430, when the position and/or the direction of the bar-code changes, the application may adjust the position and/or the direction of the three-dimensional virtual object image according to the position and direction information of the bar-code. Further, in step S440, the virtual image display determines whether the bar-code disappears, and in the case where the bar-code does not disappear, step S430 may be repeatedly performed. In contrast, in the case where the bar-code disappears, step S450 is performed.

In step S450, the virtual image display may obtain the inertial measurement information of the mobile phone and estimate a position and a directional angle, for example, equal to (M, N). Moreover, the virtual image display may activate the timer at the same time. Next, in step S460, the virtual image display redraws the virtual object image according to the position and the directional angle that is, for example, equal to (X, Y). The position and the directional angle (X, Y) are the position and the directional angle of the object image and may be obtained according to the position and the directional angle (M, N) of the mobile phone. In this embodiment, the designer may pre-establish a conversion relationship between space coordinates of the displayed image of the virtual image display and space coordinates of the mobile phone and converts the position and the directional angle of the mobile phone (M, N) through this conversion relationship to generate the position and the directional angle (X, Y) of the object image. Establishing the coordinate relationship in two spaces and performing the conversion is a technique well known to those skilled in the art, and description thereof is not provided herein.

In step S470, the detection of whether the bar-code disappears is continuously performed, and when the bar-code is still missing, the display of the virtual object image is stopped (step S480). In contrast, in the case where the bar-code reappears in step S470, step S430 is executed again to continue displaying and controlling the object image.

In this embodiment, a time interval during which step S440 and step S470 are executed may be greater than or equal to the predetermined length of time provided in the foregoing embodiment.

In view of the foregoing, the virtual image display of the disclosure may display the object image according to the identification pattern on the handheld electronic device. Moreover, when the identification pattern on the handheld electronic device disappears, the virtual image display may continuously display the object image based on the inertial measurement information of the handheld electronic device, and the display performance is therefore effectively improved.

What is claimed is:

1. A virtual image display system, comprising: a handheld electronic device, configured to display an identification pattern, wherein the identification pattern corresponds to an object image; and a virtual image display, electrically coupled to the handheld electronic device, wherein the virtual image display is configured for: photographing the identification pattern and displaying the object image according to the identification pattern; and capturing by the virtual image display inertial measurement information of the handheld electronic device when the identification pattern disappears, and adjusting at least one of a position and a direction of the object image according to the inertial measurement information;

wherein a controller stops transmitting a request signal to the handheld electronic device, and the handheld electronic device stops executing the inertial measurement after timing duration of disappearance of the identification pattern is greater than a predetermined length of time or after the timing duration of disappearance is less than the predetermined length of time and the identification pattern reappears.

2. The virtual image display system according to claim 1, wherein the virtual image display further adjusts at least one of the position and the direction of object image according to position and direction information of the identification pattern.

3. The virtual image display system according to claim 1, wherein the virtual image display further comprises:
   an image capturing device, disposed on the virtual image display and configured to photograph the identification pattern.

4. The virtual image display system according to claim 1, wherein the virtual image display is further configured for: transmitting the request signal to the handheld electronic device when the identification pattern disappears, wherein the handheld electronic device activates inertial measurement according to the request signal to generate the inertial measurement information.

5. The virtual image display system according to claim 4, wherein the handheld electronic device comprises:
   a display, configured to display the identification pattern;
   an inertial measurement device, configured to generate the inertial measurement information; and
   a communication interface, configured to transmit the inertial measurement information and the request signal with the virtual image display.

6. The virtual image display system according to claim 1, wherein the virtual image display further comprises: a timer, the timing duration of disappearance of the identification pattern; and the controller, coupled to the timer, stopping displaying the object image when the timing duration of disappearance of the identification pattern is greater than the predetermined length of time.

7. The virtual image display system according to claim 1, wherein the virtual image display is a head-mounted display, and the identification pattern is a bar-code.

8. A virtual image display method, comprising: displaying by a handheld electronic device an identification pattern, wherein the identification pattern corresponds to an object image; photographing by a virtual image display the identification pattern, and displaying the object image according to the identification pattern; and capturing by the virtual image display inertial measurement information of the handheld electronic device when the identification pattern disappears, and adjusting at least one of a position and a direction of the object image according to the inertial measurement information;

the virtual image display method further comprising: stopping by the virtual image display transmitting a request signal to the handheld electronic device, and stopping by the handheld electronic device executing the inertial measurement after duration of disappearance of the identification pattern is greater than a predetermined length of time or after the duration of disappearance is less than the predetermined length of time and the identification pattern reappears.

9. The virtual image display method according to claim 8, further comprising:

adjusting at least one of the position and the direction of the object image according to position and direction information of the identification pattern.

10. The virtual image display method according to claim 8, further comprising: transmitting by the virtual image display the request signal to the handheld electronic device when the identification pattern disappears; and activating by the handheld electronic device inertial measurement according to the request signal to generate the inertial measurement information.

11. The virtual image display method according to claim 8, further comprising: stopping by the virtual image display displaying the object image when the duration of disappearance of the identification pattern is longer than the predetermined length of time.

12. The virtual image display method according to claim 8, wherein the virtual image display is a head-mounted display, and the identification pattern is a bar-code.

* * * * *